(12) United States Patent
Burd et al.

(10) Patent No.: US 10,059,454 B2
(45) Date of Patent: Aug. 28, 2018

(54) AIRCRAFT GALLEY PLUMBING SYSTEM

(71) Applicant: B/E AEROSPACE, INC., Wellington, FL (US)

(72) Inventors: Peter John Leslie Burd, Carmarthenshire (GB); Nicholas James Wilton Pearce, Seattle, WA (US)

(73) Assignee: B/E Aerospace, Inc., Wellington, FL (US)

( * ) Notice: Subject to any disclaimer, the term of this patent is extended or adjusted under 35 U.S.C. 154(b) by 226 days.

(21) Appl. No.: 15/220,219

(22) Filed: Jul. 26, 2016

(65) Prior Publication Data

US 2017/0029115 A1    Feb. 2, 2017

Related U.S. Application Data

(60) Provisional application No. 62/198,748, filed on Jul. 30, 2015, provisional application No. 62/212,995, filed on Sep. 1, 2015.

(51) Int. Cl.
*F15B 1/26* (2006.01)
*B64D 11/04* (2006.01)

(52) U.S. Cl.
CPC .................... *B64D 11/04* (2013.01)

(58) Field of Classification Search
CPC ..................................................... B64D 11/04
USPC ......... 137/596, 625.11, 625.12, 625.42, 628, 137/861, 614.06
See application file for complete search history.

(56) References Cited

U.S. PATENT DOCUMENTS

| | | | | |
|---|---|---|---|---|
| 5,769,124 A | * | 6/1998 | Ehrhardt | B64D 11/02 137/625.47 |
| 6,006,373 A | * | 12/1999 | Hoang | E03F 1/006 4/321 |
| 9,004,093 B2 | * | 4/2015 | Burd | B64D 11/04 137/115.16 |
| 9,096,321 B2 | * | 8/2015 | Burd | B64D 11/04 |
| 9,273,449 B2 | * | 3/2016 | Burd | F16K 24/042 |
| 9,546,472 B2 | * | 1/2017 | Burd | B64D 11/02 |
| 2013/0312844 A1 | * | 11/2013 | Burd | E03C 1/104 137/217 |
| 2017/0147013 A1 | * | 5/2017 | Reddy | G05D 9/12 |

OTHER PUBLICATIONS

International Search Report for International Application No. PCT/US2016/044589 (4 pgs.) dated Nov. 3, 2016.

* cited by examiner

*Primary Examiner* — Minh Le
(74) *Attorney, Agent, or Firm* — Donna P. Suchy (57) ABSTRACT

A potable water supply and waste system for an aircraft galley is provided that includes a potable water distribution manifold in fluid communication with a potable water source. The potable water distribution manifold is configured to distribute water from the potable water source to a galley insert in a work deck of the aircraft galley. A galley insert drain line is connected to the galley insert for draining waste water from the galley insert into a sump. The sump, in turn, is connected to a main drain line for the potable water supply and waste system that is positioned below the work deck. A rotary, cruciform valve is connected in fluid communication with the potable water distribution manifold and the galley insert. The cruciform valve is selectively configured to allow the potable water source to supply or drain the entire system through the same manifold.

20 Claims, 6 Drawing Sheets

AIRCRAFT GALLEY PLUMBING SYSTEM

CROSS-REFERENCES TO RELATED APPLICATIONS

This application claims priority from U.S. Provisional Application No. 62/198,748, filed Jul. 30, 2015, and U.S. Provisional Patent Application Ser. No. 62/212,995, filed Sep. 1, 2015, both of which are incorporated by reference in their entirety.

BACKGROUND

The present invention generally relates to potable water and waste systems for an aircraft, and more particularly relates to an improved potable water supply and waste system for a commercial aircraft galley.

Commercial aircraft flights commonly have aircraft galleys with a potable or drinking water system and a waste water disposal system. Galley inserts such as beverage makers and other water-consuming appliances placed in a work deck of the aircraft galley are usually connected to potable water and waste water disposal systems to provide hot and cold beverage and waste service for commercial aircraft cabin passengers during flight. Flight crew members generally fill the potable water supply system for ready access before the flight begins, and then drain the system when food and beverage service is complete at the end of the flight.

However, multiple or separate manifolds are typically used for both supplying and draining the potable water supply and waste system, taking up desired space in the work deck of the compact aircraft galley. This space may be required for multiple sources of water consumption, including but not limited to beverage makers, sinks, drip trays, and chillers. Thus, there is a need for a space-effective solution for supplying potable water to galleys, for draining waste water from galleys, and for draining unused potable water in the potable water supply and waste system. In addition, some galleys may be designed to be more compact, or have a reduced footprint, than conventional commercial aircraft galleys, making a streamlined solution that is easy to assemble all the more important.

Hence, it is desirable to provide a simplified and improved potable water supply and waste plumbing system for conventional and reduced footprint aircraft galleys installed in commercial aircraft cabin interiors. It is further desirable to provide an improved potable water supply and waste system for an aircraft galley that provides waste water collection from multiple sources of water-consumption in the work deck, incorporates backflow prevention mechanisms, and allows flushing of the entire system before commencing galley service. The present invention meets these and other needs.

SUMMARY OF THE INVENTION

The present invention provides a simplified and improved design of a potable water supply and waste water system for a commercial aircraft galley. The present invention uses a potable water distribution manifold to both supply and drain the potable water supply and waste system through the same manifold, thus minimizing the space used in the work deck of the aircraft galley. The potable water supply and waste system allows the complete filling and drainage of the system through the same manifold by using a four-way cruciform valve.

The present invention employs galley waste sumps to collect and drain waste water from drip trays, chiller condensate, and water-consuming appliances or other galley inserts in the work deck. A faucet and sink are connected to the potable and waste water system, and a backflow preventer, such as hot water backflow prevention loop, is provided to prevent discharged hot water from the galley inserts from reaching the faucet and causing potential injury to flight crew members. A compact drain strainer is further incorporated to filter the waste water and prevent waste water backflow.

The potable water supply and waste system adheres to prescribed aircraft requirements by using a minimum drainage angle of 3 degrees for piping when draining waste water and unused potable water from the water-consuming galley inserts. The system uses no water traps, and the entire system and connected water-consuming appliances can be drained when required. Additionally, the main water shut off valve for the aircraft's potable water supply is interlinked with the cruciform valve to ensure that both valves cannot be open simultaneously and drain the aircraft's potable water supply. The synchronization of the main water shut off valve and the cruciform valve allows the potable water supply and waste system to be flushed before commencing galley service and prevents continuous discharge of the aircraft potable water supply.

Accordingly, a potable water supply and waste system for an aircraft galley is provided that includes a potable water distribution manifold in fluid communication with a potable water source. The potable water distribution manifold is configured to distribute potable water from the potable water source to a plurality of galley inserts including water-consuming appliances in the work deck of the aircraft galley. The potable water source may be located above the ceiling of the aircraft galley. A vent valve may be included that is in fluid communication with the potable water distribution manifold to ensure that the potable water source completely fills the potable water supply and waste system.

The potable water supply and waste system further includes a water filter in fluid communication with the potable water source and the potable water distribution manifold. The water filter is preferably self-venting. Moreover, the system includes galley insert drain lines connected to the water-consuming appliances and other galley inserts in the work deck for receiving waste water from the galley inserts. In one example, the galley insert is a beverage maker that is connected to the potable water distribution manifold and the galley insert drain line, although other water-consuming appliances can be used.

Furthermore, the potable water supply and waste system includes one or more sumps connected to a main drain line. The sumps are configured to receive the waste water from the galley inserts via the galley insert drain lines and drain the waste water into the main drain line. The sumps may also be fitted with a fabric, such as a recessed mesh screen, to prevent blockage of the main drain line. The main drain line is preferably positioned below the work deck of the aircraft galley, for example, between chilled air return plenums of galley cart bays in the aircraft galley. Additionally, a compact drain strainer connected to the main drain line may be included in the potable water supply and waste system that is configured to filter the waste water and prevent waste water backflow.

Additionally, the potable water supply and waste system may include a faucet in fluid communication with the potable water distribution manifold, and a sink connected to the main drain line. In such case, the sink is configured to receive potable water from the faucet and drain waste water into the main drain line. The faucet may be self-venting. A backflow preventer, such as a backflow prevention loop, is preferably included that prevents hot water from the galley insert from reaching the faucet.

In a preferred aspect, the potable water supply and waste system further includes a cruciform valve in fluid communication with the potable water distribution manifold and the water filter. The cruciform valve is configured to control the flow of potable water through the potable water distribution manifold to the galley inserts by operating between a supplying state and a draining state. In the supplying state the cruciform valve permits the flow of potable water through the potable water distribution manifold to the galley inserts. In the draining state the cruciform valve drains the potable water supplied by the potable water source from the potable water distribution manifold into the main drain line.

The potable water supply and waste system also includes a main water shut off valve in fluid communication with the potable water source. The main water shut off valve is configured to permit the supply of potable water from the potable water source to the potable water distribution manifold when in an opened state, and to block the supply of potable water from the potable water source to the potable water distribution manifold when in a closed state. Moreover, the cruciform valve and the main water shut off valve are interlinked such that when the cruciform valve is in the supplying state, the main water shut off valve is switched to the opened state, and when the cruciform valve is in the draining state, the main water shut off valve is switched to the closed state. In this way, the potable water supply and waste system avoids continuous discharge of the aircraft's potable water supply by preventing the cruciform valve and the main water shut off valve from being simultaneously in the draining state and the opened state, respectively. The cruciform valve and the main water shut off valve may be manually or electrically controlled by a cable.

The potable water supply and waste system may include a service wall on which the potable water distribution manifold, the water filter, the galley insert drain lines, the one or more sumps, the main drain line, and the cruciform valve are fitted such that the potable water supply and waste system is installable in the work deck of the aircraft galley as a complete assembly.

These and other features and advantages of the present invention will become more apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
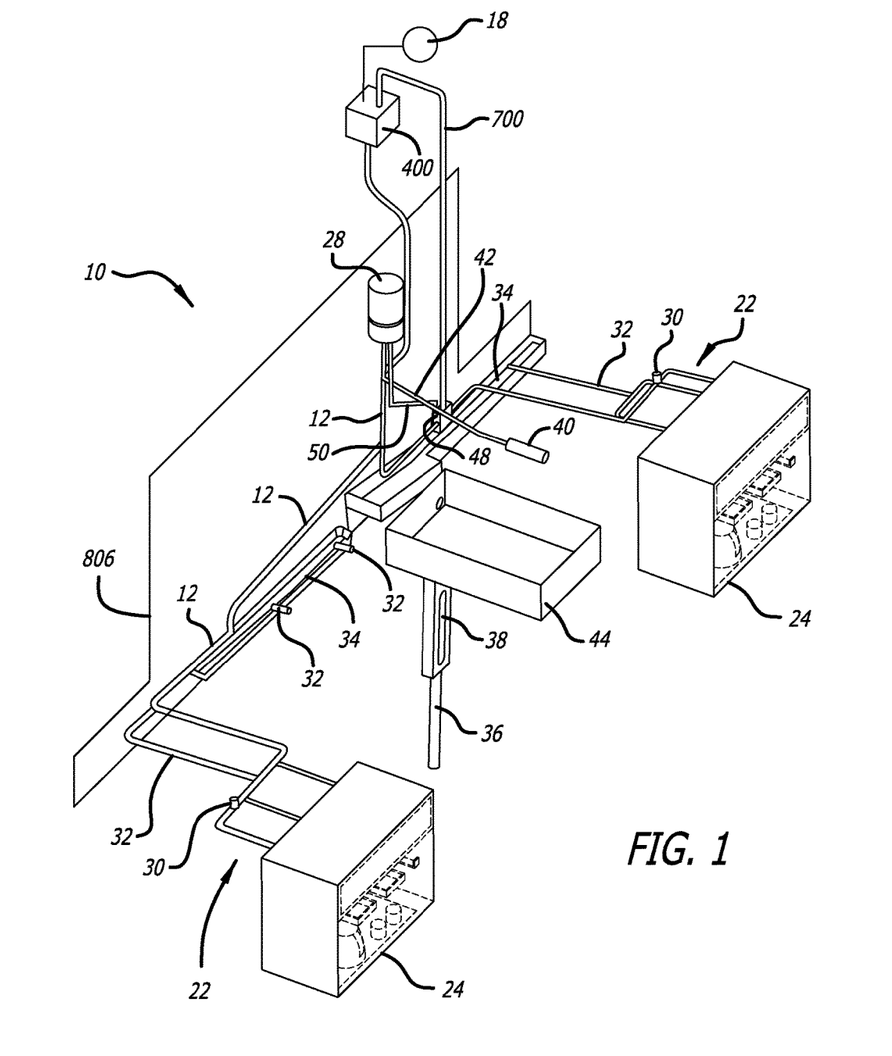
FIG. 1 is a perspective view of an improved potable water supply and waste system for an aircraft galley according to a preferred embodiment of the present invention, including a cruciform valve for controlling the flow of potable water through the potable water supply and waste system, and a main water shut off valve for preventing the flow of potable water to the aircraft galley.
Figure 2:
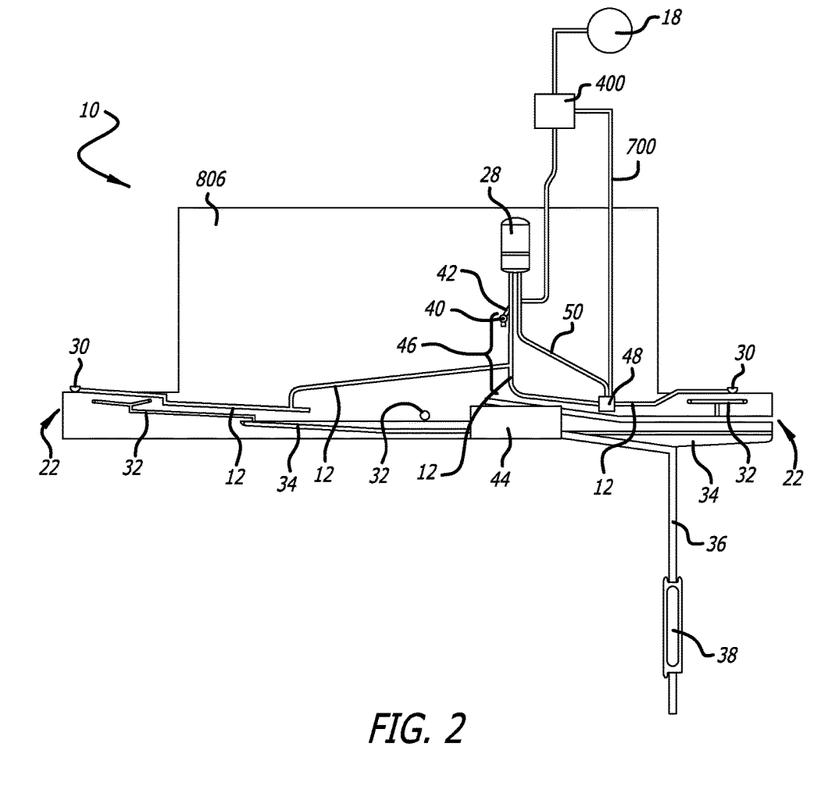
FIG. 2 is a front side elevational view of the improved potable water supply and waste system depicted in FIG. 1.
Figure 7:
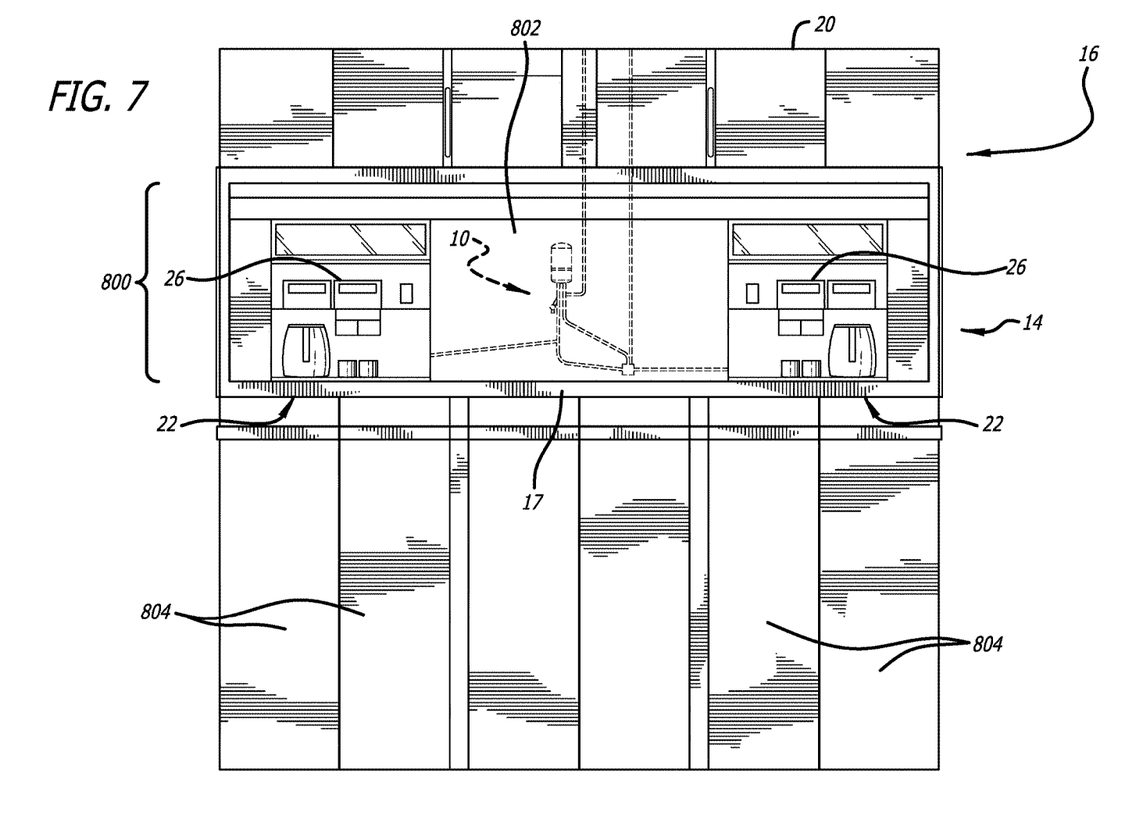
FIG. 7 is a front side elevational view of an aircraft galley in which the improved potable water supply and waste system of FIG. 1 may be installed.

Referring to FIGS. 1 and 2, the preferred embodiment of the present invention provides for a simplified and improved potable water supply and waste system for a commercial aircraft galley. As shown in FIG. 1, the potable water supply and waste system 10 includes a potable water distribution manifold 12 for both supplying potable water to, and draining potable water from, water consumption sources in a work deck 14 of an aircraft galley 16 (see FIG. 7). As used herein, the term "work deck" includes the working surface or working platform 17 of an aircraft galley as well as the area 800 immediately adjacent to the working surface as shown in FIG. 7.

Figure 8:
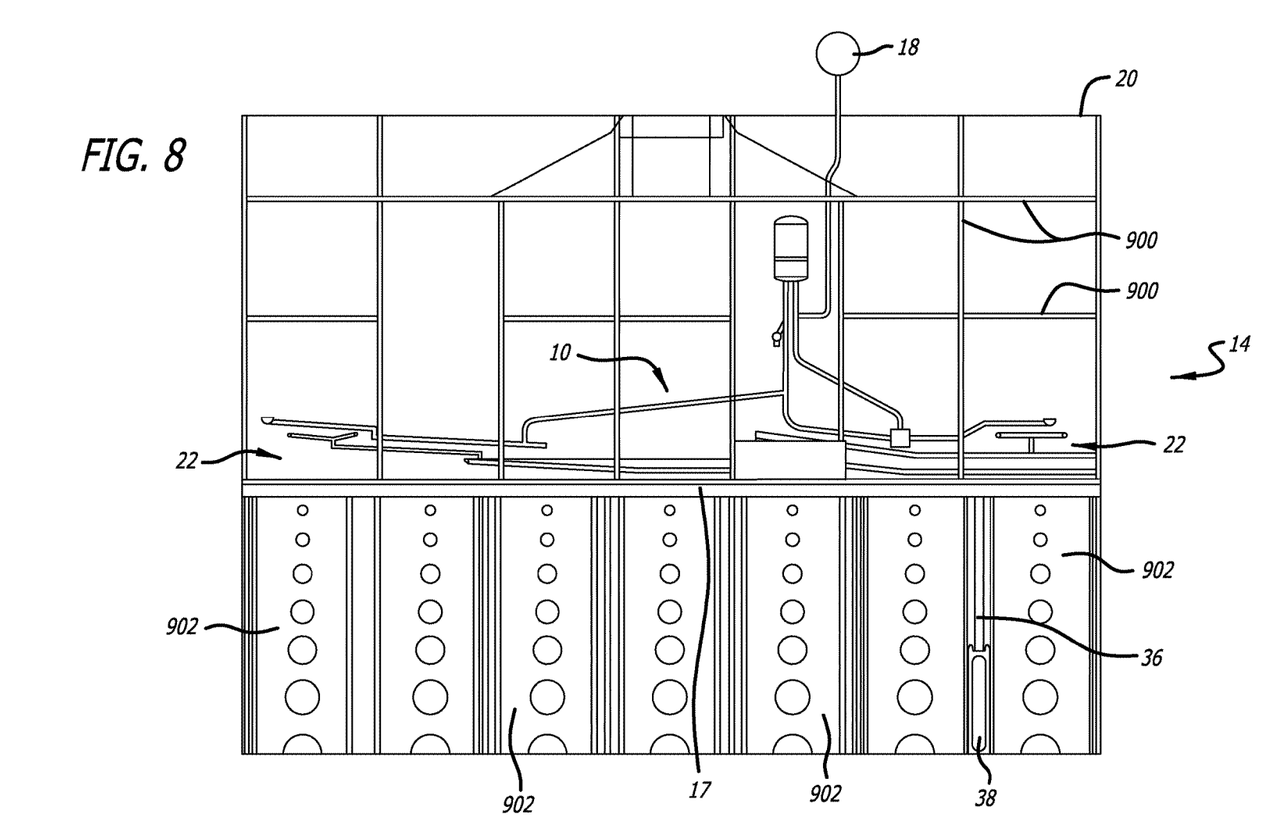
FIG. 8 is a front side elevational view of the aircraft galley of FIG. 7, in which the front of the aircraft galley has been broken away to illustrate placement of the improved potable water supply and waste system as installed.

The potable water distribution manifold is in fluid communication with a potable water source 18. The potable water source provides potable water to the aircraft including the aircraft galley and is generally located in a remote location from the potable water distribution manifold. Such a remote location may be, for example, above the work deck, above the ceiling 20 of the galley as shown in FIG. 8, in another area of the commercial aircraft cabin, or in other suitable locations. The potable water distribution manifold connects to one or more remote areas 22 of the work deck or galley, at which a galley insert 24 such as the beverage maker 26 depicted in FIG. 7 can be placed and connected to the potable water distribution manifold. Galley inserts may include beverage makers or other water-consuming appliances, drip trays, chillers, and the like. As a result, the potable water distribution manifold distributes water from the potable water source to the galley inserts.

As shown in FIG. 2, preferably a water filter 28 is connected to the potable water distribution manifold 12 and the potable water source 18. The water filter filters the potable water received from the potable water source before it is distributed through the potable water distribution manifold to the galley inserts 24. Moreover, the water filter is preferably self-venting and the potable water distribution manifold preferably includes one or more vent valves 30 to ensure that the potable water source completely fills the potable water supply and waste system 10 when supplying water to the aircraft galley 16.

Provided at each remote area 22 are one or more galley insert drain lines 32 or remote area drain lines. The galley insert drain lines are connected to the galley inserts 24 and receive waste water or consumed water from the galley inserts. One or more sumps 34 are positioned near the galley insert drain lines to receive the waste water flowing through the galley insert drain lines from the galley inserts. The sumps are connected to a main drain line 36 that is preferably positioned below the work deck 14. The sumps allow the waste water from the galley inserts to drain through the galley insert drain lines, into the sumps, and down the main drain line. According to a preferred aspect, the sumps are fitted with a filter (not shown), for example a recessed mesh screen, to prevent blockage of the main drain line by solid waste. According to another preferred aspect, the main drain line is connected in fluid communication with a compact drain strainer 38 located below the work deck. The compact drain strainer is preferably used to filter the drained waste water and preferably includes a backflow preventer (not shown) that prevents back flow of the waste water up the main drain line.

Additionally, a faucet 40 is connected in fluid communication with the potable water distribution manifold 12 via a dedicated faucet supply line 42. The faucet is preferably self-venting to ensure complete filling of the potable water supply and waste system 10. A sink 44 connected to the main drain line 36 receives potable water from the faucet and drains the resulting waste water into the main drain line.

Generally, hot water may occasionally backflow into the potable water distribution manifold 12. For example, hot water from beverage makers 26 or from other galley inserts 24 located at the remote areas 22 may backflow into the potable water distribution manifold. To prevent this backflow of hot water from reaching the faucet 40 and potentially causing injury to a crew member, a backflow preventer 46 such as a back flow prevention loop is preferably incorporated.

Figure 3:
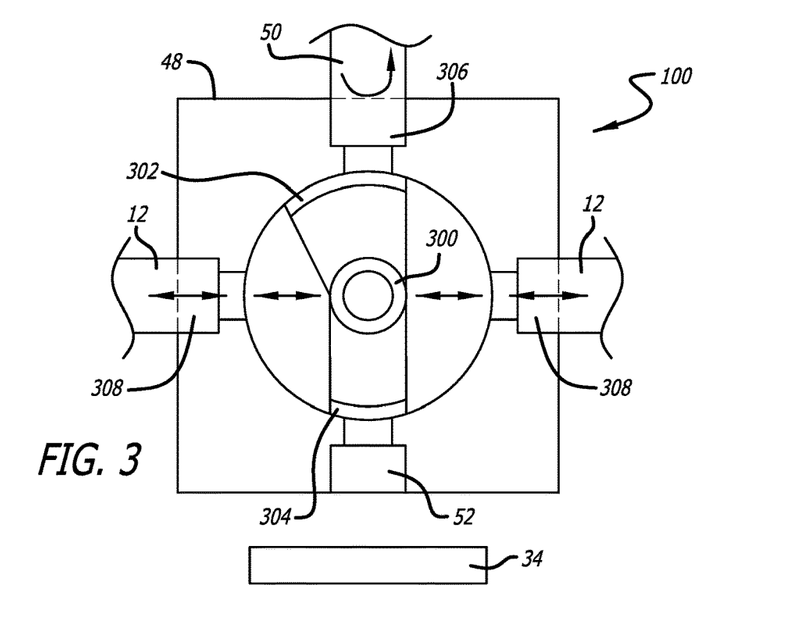
FIG. 3 is a schematic view of the cruciform valve of FIG. 1 operating in a supplying state.
Figure 4:
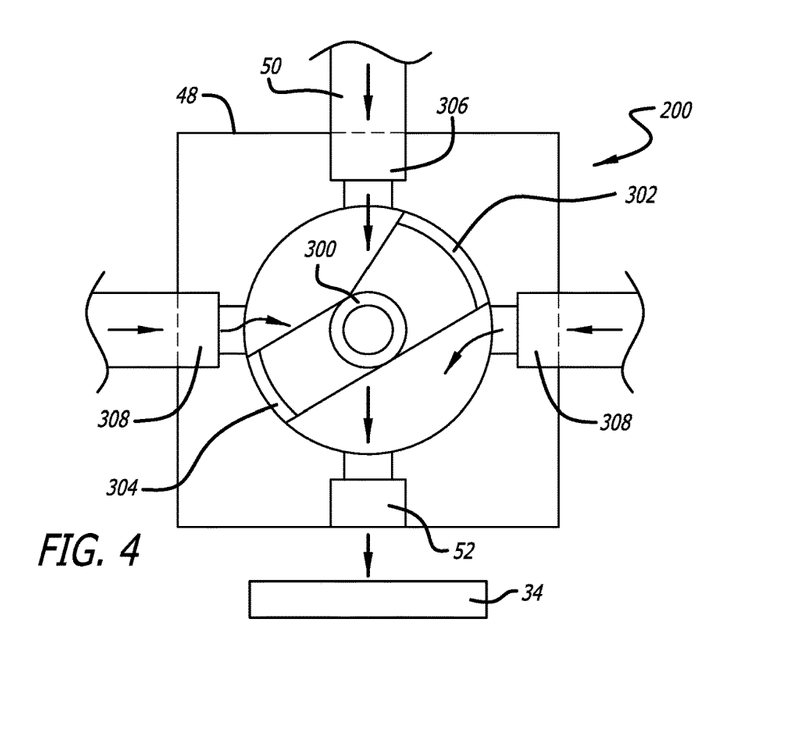
FIG. 4 is a schematic view of the cruciform valve of FIG. 1 operating in a draining state.

Referring to FIGS. 3 and 4, according to a preferred embodiment of the present invention, the potable water supply and waste system 10 includes a rotary, 4-way flow control valve or cruciform valve 48 that is connected in fluid communication with the potable water distribution manifold 12, the water filter 28 through a water filter drain line 50, and the one or more galley inserts 24. The cruciform valve is used to selectively control the flow of potable water in the potable water supply and waste system 10. For example, before food and beverage service begins on a flight, the cruciform valve may be rotatably operated to allow the potable water source 18 to supply potable water to galley inserts in the work deck 14, and when food and beverage service is completed at the end of the flight, the cruciform valve may be rotatably operated to allow the excess potable water in the potable water supply and waste system to drain. In this regard, the cruciform valve is intentionally designed to leave open a dedicated drain opening or system drain port 52 preferably facing the one or more sumps 34 into which the unused potable water may drain, thereby allowing flight crew members to flush the potable water supply and waste system prior to the next flight.

Preferably, the cruciform valve 48 selectively operates between a supplying state 100 and a draining state 200. The cruciform valve may operate in its supplying state, for example, during the operation of the aircraft galley 16 during flight. Moreover, the cruciform valve may operate in its draining state, for instance, when food service is complete at the end of a flight.

As illustrated in FIG. 3, when the cruciform valve is in the supplying state, the cruciform valve allows potable water in the potable water distribution manifold 12 to flow through the cruciform valve to the galley inserts 24. While in the supplying state, the cruciform valve also prevents potable water in the water filter drain line 50 from flowing through the cruciform valve, thereby forcing the potable water to flow through the water filter 28 and into the potable water distribution manifold.

To accomplish this, the cruciform valve 48 includes a rotating member 300 that includes a first end 302 and a second end 304. When the cruciform valve is in the supplying state 100, as depicted in FIG. 3, the first end of the rotating member blocks the flow of potable water through the water filter drain port 306 of the cruciform valve. Simultaneously, the second end of the rotating member blocks the flow of potable water through the system drain port 52. As a result, potable water is forced to flow through the water filter 28, into the potable water distribution manifold 12, through the cruciform valve via water distribution manifold ports 308, and to the galley inserts 24, thereby allowing the potable water source 18 to supply potable water to water-consuming appliances or other galley inserts 24 in the work deck 14.

When the cruciform valve 48 is switched to the draining state 200, as shown in FIG. 4, the cruciform valve allows the potable water remaining in the potable water distribution manifold 12, the water filter 28, and the galley inserts 24 to drain out of the dedicated drain opening or system drain port 52 into the one or more sumps 34 and ultimately down the main drain line 36, thereby flushing the potable water supply and waste system 10. In particular, as FIG. 4 illustrates, the first end 302 of the rotating member 300 is moved such that it clears the water filter drain port 306, and the second end 304 of the rotating member is moved such that it clears the system drain port. In this way, excess potable water in the potable water supply and waste system 10 including the water filter drain line 50 is allowed to flow through the water distribution manifold ports 308 and water filter drain port of the cruciform valve down the system drain port and into the one or more sumps, thereby flushing the potable water supply and waste system.

Figure 5:
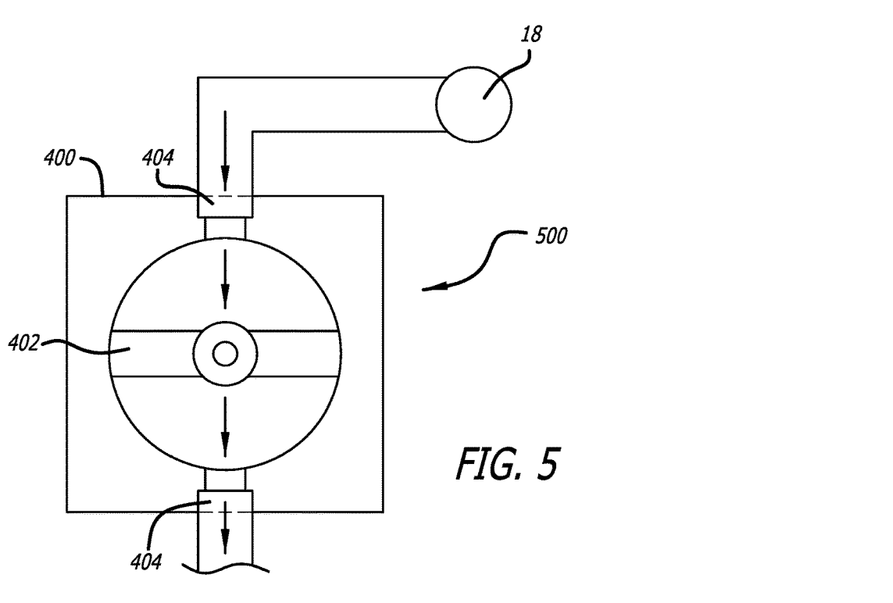
FIG. 5 is a schematic view of the main water shut off valve of FIG. 1 operating in an opened state.
Figure 6:
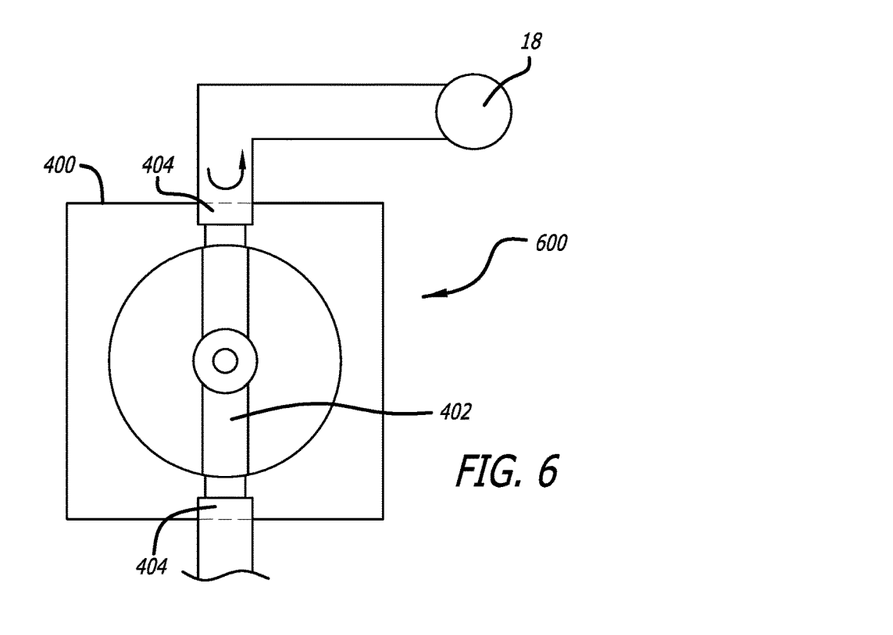
FIG. 6 is a schematic view of the main water shut off valve of FIG. 1 operating in a closed state.

Referring to FIGS. 5 and 6, according to a preferred aspect, a main water shut off valve 400 is connected in fluid communication with the potable water source 18 for preventing the flow of potable water to the aircraft galley 16 if necessary. Although these Figures illustrate a possible embodiment of a main water shut off valve that operates using a hollow rotating member 402 similarly to the cruciform valve 48, any main water shut off valve known to one of ordinary skill in the art can be used. The main water shut off valve preferably operates between an opened state 500, as shown in FIG. 5, and a closed state 600 as shown in FIG. 6. In the opened state, the main water shut off valve allows the potable water from the potable water source to flow through valve ports 404 into the potable water distribution manifold 12 and supply potable water to the galley inserts 24. In the closed state, the main water shut off valve blocks the potable water from flowing through the valve ports into the potable water distribution manifold.

When the cruciform valve 48 is in its draining state 200 to flush the potable water supply and waste system 10, the main water shut off valve 400 cannot simultaneously be in its opened state 500. Otherwise, continuous discharge or draining of the aircraft's potable water supply would occur. Accordingly, the cruciform valve and the main water shut off valve are preferably interlinked and synchronized such that operation of the cruciform valve into its supplying state 100 simultaneously switches the main water shut off valve into its opened state, and operation of the cruciform valve into its draining state simultaneously switches the main water shut off valve into its closed state 600. For example, the cruciform valve and main water shut off valve may be interlinked by a cable 700 (see FIG. 1) that is configured to rotate hollow rotating member 402 in response to movement of rotating member 300. Cable 700 is preferably a manual cable but may alternatively be an electrical cable if the cruciform valve and/or main water shut off valve are electrically operated. As a result, the cruciform valve is never in the draining state 200 when the main water shut off valve is in the opened state, and continuous discharge of the potable water source 18 is thereby avoided. The synchronization of the cruciform valve and main water shut off valve allow the potable water supply and waste system to be flushed before commencing galley service.

Therefore, a flight crew member who desires to supply potable water to the potable water supply and waste system 10 before a flight may simultaneously switch the cruciform valve 48 into its supplying state 100 and the main water shut off valve 400 into its opened state 500 to allow the potable water source 18 to supply water to the potable water supply and waste system. Moreover, a crew member who desires to drain the unused potable water from the potable water supply and waste system after a flight may simultaneously switch the cruciform valve into its draining state 200 and the main water shut off valve into its closed state 600 to allow the unused potable water to drain without draining the aircraft's potable water supply.

FIG. 7 illustrates an example of an aircraft galley 16 with work deck 14 inside which the potable water supply and waste system 10 may be installed. In a preferred embodiment, the potable water supply and waste system may be installed behind the wall 802 of the work deck above the galley cart bays 804. According to a presently preferred aspect, the potable water supply and waste system 10 is also fitted prior to installation and use on a service wall 806 (see e.g., FIG. 1). The service wall including the fitted potable water supply and waste system is then installed along with electrical systems and air systems as a complete assembly in the aircraft galley.

FIG. 8 illustrates a preferred embodiment of the potable water supply and waste system 10 after it is installed in the work deck 14 of the aircraft galley 16. The potable water supply and waste system 10 is positioned behind above work deck structure 900 over existing, chilled air return plenums 902 for beverage galley carts. The chilled air return plenums are located inside the galley cart bays 804 of FIG. 7. The compact drain strainer 38 is sized to fit below the work deck between the chilled air return plenums to filter the waste water and act as a backflow preventer, and the faucet 40 and sink 42 are accessible for crew member use. Moreover, the potable water distribution manifold 12 is connected in fluid communication with the potable water source 18 of the aircraft. The potable water distribution manifold and galley insert drain lines 32 are further connected to the galley inserts 24 in the work deck, such as the beverage makers 26 depicted in FIG. 7.

As a result, the preferred embodiment of the present invention provides an improved, simplified, and space-effective solution using a single potable water distribution manifold for supplying potable water to, and draining potable water from, multiple sources of water consumption in the work deck of conventional and reduced footprint aircraft galleys. Moreover, the preferred embodiment of the present invention provides waste water collection from multiple sources of water-consumption in the work deck, incorporates backflow prevention mechanisms, and allows flushing of the entire system before commencing galley service.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A potable water supply and waste system for an aircraft galley, the system comprising:
   a potable water distribution manifold in fluid communication with a potable water source, the potable water distribution manifold configured to distribute potable water from the potable water source to a galley insert in a work deck of the aircraft galley;
   a water filter in fluid communication with the potable water source and the potable water distribution manifold;
   a galley insert drain line connected to the galley insert for receiving waste water from the galley insert;
   a sump connected to a main drain line, the main drain line being positioned below the work deck, the sump configured to receive the waste water from the galley insert drain line and drain the waste water into the main drain line;
   a cruciform valve in fluid communication with the potable water distribution manifold and the water filter, the cruciform valve configured to control the flow of potable water through the potable water distribution manifold to the galley insert, wherein the cruciform valve is configured to operate between a supplying state in which the cruciform valve permits the flow of potable water through the potable water distribution manifold to the galley insert and a draining state in which the cruciform valve drains the potable water supplied by the potable water source from the potable water distribution manifold into the main drain line;
   a main water shut off valve in fluid communication with the potable water source, the main water shut off valve configured to permit the supply of potable water from the potable water source to the potable water distribution manifold when in an opened state and to block the supply of potable water from the potable water source to the potable water distribution manifold when in a closed state;
   wherein the cruciform valve and the main water shut off valve are interlinked such that when the cruciform valve is in the supplying state, the main water shut off valve is switched to the opened state, and when the cruciform valve is in the draining state, the main water shut off valve is switched to the closed state, thereby preventing the cruciform valve and the main water shut off valve from being simultaneously in the draining state and the opened state, respectively.

2. The potable water supply and waste system of claim 1, wherein the potable water source is located above a ceiling of the aircraft galley.

3. The potable water supply and waste system of claim 1, wherein the main drain line is positioned below the work deck between chilled air return plenums.

4. The potable water supply and waste system of claim 1, wherein the galley insert is a beverage maker and the beverage maker is connected to the potable water distribution manifold and the galley insert drain line.

5. The potable water supply and waste system of claim 1, further comprising:
   a faucet in fluid communication with the potable water distribution manifold; and
   a sink connected to the main drain line, the sink configured to receive potable water from the faucet and drain waste water into the main drain line.

6. The potable water supply and waste system of claim 5, wherein the water filter and the faucet are self-venting.

7. The potable water supply and waste system of claim 5, further comprising a backflow preventer that is configured to prevent hot water from the galley insert from reaching the faucet.

8. The potable water supply and waste system of claim 1, further comprising a vent valve in fluid communication with the potable water distribution manifold.

9. The potable water supply and waste system of claim 1, wherein the sump is fitted with a fabric to prevent blockage of the main drain line.

10. The potable water supply and waste system of claim 1, further comprising a compact drain strainer connected to the main drain line that is configured to filter the waste water and prevent waste water backflow.

11. The potable water supply and waste system of claim 1, wherein the cruciform valve and the main water shut off valve are manually controlled by a cable.

12. The potable water supply and waste system of claim 1, wherein the cruciform valve and the main water shut off valve are electrically controlled by a cable.

13. The potable water supply and waste system of claim 1, further comprising a service wall on which the potable water distribution manifold, the water filter, the galley insert drain line, the sump, the main drain line, and the cruciform valve are fitted such that the potable water supply and waste system is installable in the aircraft galley as a complete assembly.

14. A potable water supply and waste system for an aircraft galley, the system comprising:
    a potable water distribution manifold in fluid communication with a potable water source, the potable water distribution manifold configured to distribute potable water from the potable water source to a plurality of water-consuming appliances in a work deck of the aircraft galley, the potable water source being located above a ceiling of the aircraft galley;
    a water filter in fluid communication with the potable water source and the potable water distribution manifold;
    a plurality of galley insert drain lines connected to the plurality of water-consuming appliances for receiving waste water from the water-consuming appliances;
    a plurality of sumps connected to a main drain line, the main drain line being positioned below the work deck, the sumps configured to receive the waste water from the plurality of galley insert drain lines and drain the waste water into the main drain line;
    a cruciform valve in fluid communication with the potable water distribution manifold, the water filter, and the plurality of water-consuming appliances, wherein the cruciform valve is configured to operate between a supplying state in which the cruciform valve permits the flow of potable water through the potable water distribution manifold to the plurality of water-consuming appliances and a draining state in which the cruciform valve drains the potable water supplied by the potable water source from the potable water distribution manifold into the main drain line;
    a main water shut off valve in fluid communication with the potable water source, the main water shut off valve configured to permit the supply of potable water from the potable water source to the potable water distribution manifold when in an opened state and to block the supply of potable water from the potable water source to the potable water distribution manifold when in a closed state;
    wherein the cruciform valve and the main water shut off valve are interlinked such that when the cruciform valve is in the supplying state, the main water shut off valve is switched to the opened state, and when the cruciform valve is in the draining state, the main water shut off valve is switched to the closed state, thereby preventing the cruciform valve and the main water shut off valve from being simultaneously in the draining state and the opened state, respectively.

15. The potable water supply and waste system of claim 14, further comprising:
    a faucet in fluid communication with the potable water distribution manifold; and
    a sink connected to the main drain line, the sink configured to receive potable water from the faucet and drain waste water into the main drain line.

16. The potable water supply and waste system of claim 15, wherein the water filter and the faucet are self-venting.

17. The potable water supply and waste system of claim 15, wherein the potable water distribution manifold includes a backflow preventer that is configured to prevent hot water from the plurality of water-consuming appliances from reaching the faucet.

18. The potable water supply and waste system of claim 14, further comprising a vent valve in fluid communication with the potable water distribution manifold.

19. The potable water supply and waste system of claim 14, further comprising a compact drain strainer connected to the main drain line that is configured to filter the waste water and prevent waste water backflow.

20. The potable water supply and waste system of claim 14, further comprising a service wall on which the potable water distribution manifold, the water filter, the plurality of galley insert drain lines, the plurality of sumps, the main drain line, and the cruciform valve are fitted such that the potable water supply and waste system is installable in the aircraft galley as a complete assembly.

* * * * *